United States Patent [19]

Isono et al.

[11] 4,364,083
[45] Dec. 14, 1982

[54] BEAM INDEX TYPE COLOR TELEVISION RECEIVER

[75] Inventors: Katsuo Isono; Senri Miyaoka; Kinya Shinkai, all of Tokyo, Japan

[73] Assignee: Sony Corporation, Tokyo, Japan

[21] Appl. No.: 142,029

[22] Filed: Apr. 21, 1980

[30] Foreign Application Priority Data

Apr. 23, 1979 [JP] Japan ................. 54-49948

[51] Int. Cl.³ .............................................. H04N 9/24
[52] U.S. Cl. .............................................. 358/69
[58] Field of Search ............... 358/67, 69, 70; 316/10, 316/12 ND, 370, 371

[56] References Cited

U.S. PATENT DOCUMENTS

| 2,887,528 | 5/1959 | Rhodes | 358/67 |
| 3,123,667 | 3/1964 | Johnston | 358/69 |
| 3,204,024 | 8/1965 | Keizer | 358/69 |

FOREIGN PATENT DOCUMENTS 2035020 6/1980 United Kingdom ............... 358/69

Primary Examiner—John C. Martin
Attorney, Agent, or Firm—Lewis H. Eslinger; Alvin Sinderbrand

[57] ABSTRACT

A beam index type color television receiver having a beam index type color cathode ray tube which includes a screen having a plurality of groups of color phosphor elements and index phosphor elements, an index signal sensing device for detecting index signals from the index phosphor elements and generating index pulses, a frequency multiplier for providing a timing signal with a frequency that is a multiple of the frequency of the index pulses, a gate signal generator supplied with the timing signal from the frequency multiplier and generating a plurality of gate signals, a gate circuit for sequentially selecting, response to the gate signals three primary color signals desired from an input video signal and supplying the selected primary color signals to the cathode ray tube, and a velocity modulating device for modulating the beam scanning velocity of the cathode ray tube. To control the modulation of the beam scanning velocity, a video signal level detecting circuit detects the level of the input video signal, and a velocity modulating signal generating circuit supplies a velocity modulating signal to the velocity modulating circuit in response both to the output of the video signal level detecting circuit and to the timing of the index pulses.

7 Claims, 12 Drawing Figures

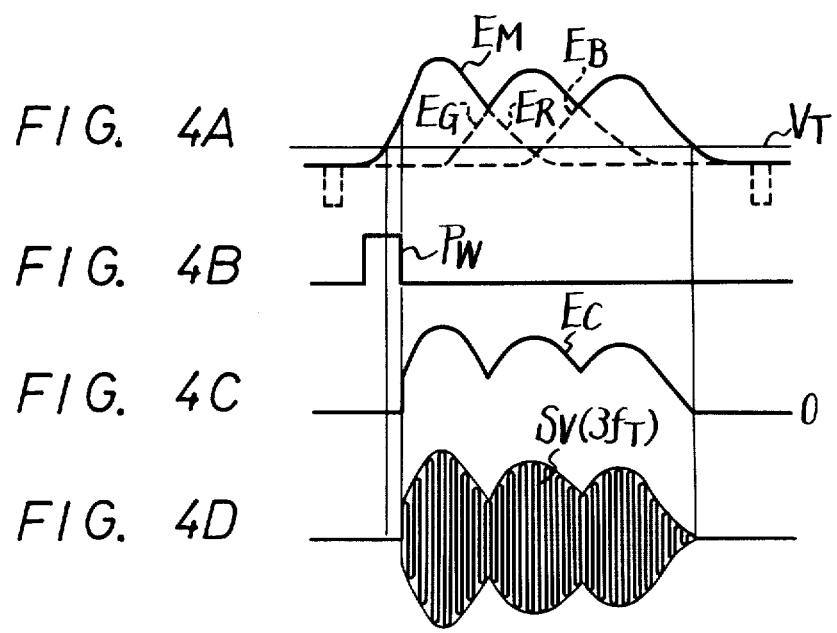
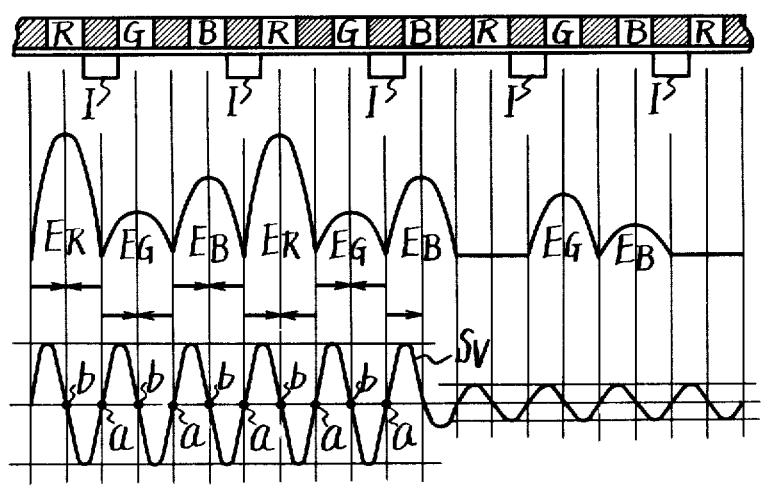

BEAM INDEX TYPE COLOR TELEVISION RECEIVER

BACKGROUND OF THE INVENTION

1. FIELD OF THE INVENTION

The present invention relates generally to a beam index type color television receiver, and is directed more particularly to a beam index type color television receiver having a beam index type color cathode ray tube in which the scanning velocity of the cathode beam is modified.

2. Description of the Prior Art

A conventional beam index type color television receiver includes a beam index type color cathode ray tube in which an electron gun emits a single electron beam which scans across a phosphor screen consisting of red, green and blue vertical color phosphor stripes arranged to repeat at intervals, in the horizontal direction and index phosphor stripes arranged on the inner surface of the phosphor screen to repeat at intervals in the horizontal direction. In such a receiver, the color switching of the single electron beam is carried out independence upon an index signal which is produced when the electron beam scans the index phosphor stripes, so that the electron beam is density-modulated by a red primary color signal when the electron beam scans the red color phosphor stripes, by a green primary color signal when the electron beam scans the green color phosphor stripes, and by a blue primary color signal when the electron beam scans the blue color phosphor stripes.

According to conventional techniques, in order to increase the luminance and the degree of color saturation in the color cathode ray tube, it has been proposed that the scanning velocity of the electron beam should be modulated by a signal with a constant amplitude and also by a so-called write-in frequency which is determined by the repetition frequency, or periodic spacing of the color phosphor stripes and the scanning velocity of the electron beam.

For example, as shown in FIG. 1, an index phosphor stripe I is provided at positions among red, green and blue color phosphor stripes R, G and B at the ratio of three index phosphor stripes I for each two triplets or set of three of the color phoshpor stripes R, G and B. A signal SV with a constant amplitude and a frequency 3 $f_T$, that is, three times as the write-in frequency, or triplet frequency $f_T$, with the latter being determined by the repetition frequency of one set of the color phosphor stripes and the scanning velocity of the electron beam, is supplied to a horizontal deflection device for modulating the scanning speed at the phase shown in FIG. 1 to modulate the scanning velocity of the electron beam. As a result, the scanning velocity of the electron beam is so modulated that the beam is focussed or converged toward a point b from a point a as indicated by arrows in FIG. 1. In other words, the time period in which the electron beam scans the color phosphor stripes R, G and B becomes longer to increase the luminance and the degree of color saturation.

According to this method, however, the time period in which the electron beam scans the portion between adjacent color phosphor stripes R, G and B is shortened and accordingly the time period of scanning the index phosphor stripe I becomes short. Therefore, since the level of the index signal is determined by the product of the magnitude of the beam current and the time period in which the electron beam scans the index phosphor stripe I, the level of the index signal is lower than the level of the index signal in a receiver in which the scanning velocity of the electron beam is not modulated. Therefore, although the beam current is large when the picture displaced on the screen is bright, this method works adequately. However, when the picture displayed on the screen is dark and hence the beam current is small, the level of the index signal becomes relatively low and the signal-to-noise ratio of the index signal becomes so low that accurate color reproduction can not be carried out.

Also, when a so-called write-in signal, which corresponds to the signal selected from the respective primary color signals, is supplied through a video amplifier as a drive voltage $E_D$ (FIG. 1) to, for example, a first grid of the color cathode ray tube, the, a drive voltgage $E_D$ applied to the first grid tends to lack sharp rising and falling edges owing to the characteristic of the video amplifier. Here, as shown in FIG. 1 the drive voltage $E_D$ corresponds to the reproduction of, for example, green color only. Because of the lack of sharpness encountered in the video amplifier, the scanning positions of the electron beam on the color phosphor stripes are displaced and hence the luminance and the degree of color saturation are lowered. However, if the scanning velocity of the electron beam is modulated as set forth above, the lack of sharpness in the rising and falling edges of drive voltage $E_D$ due to the characteristic of the video amplifier is not a significant problem, and the luminance and saturation are significantly improved.

The lack of sharpness in the rising and falling edges of drive voltage $E_D$ due to the characteristic of the video amplifier is not uniform with the amplitude of drive voltage $E_D$, but becomes more significant as the level of drive voltage $E_D$ and the beam current become large, as shown in FIG. 1. If the drive voltage $E_D$ has a low level and the beam current is small, the lack of sharpness of drive voltage $E_D$ in its rising and falling edges poses no problem. Therefore, it is neither necessary nor desirable that the scanning velocity of the beam be modulated uniformly for all levels of the drive voltage $E_D$.

When the picture displayed on the screen becomes bright and the beam current becomes large, the size of the beam spot also becomes large with the result that the electron beam scans the adjacent color phosphor stripes simultaneously with the intended phosphor stripe and, hence, the degree of color saturation is lowered. However, such increase of the spot size of the electron beam can be compensated for by modulating the scanning velocity of the electron beam as set forth above. Nevertheless, when the beam current is small, the corresponding above increase of the degree of beam spot size and hence the lowering of the color saturation do not occur. Therefore, it does not benefit the quality of the displayed picture if the scanning velocity is uniformly modulated to increase the degree of color saturation when the beam current is small.

OBJECTS AND SUMMARY OF THE INVENTION

Accordingly, an object of the present invention is to provide a novel beam index type color television receiver free of the defect as described above that is encountered in the prior art.

Another object of the invention is to provide a beam index type color television receiver in which a signal with a frequency corresponding to the write-in frequency and an amplitude corresponding to the strength of beam current, and the scanning velocity of an electron beam is modulated such the signal.

According to an aspect of the present invention a beam index type color television receiver comprises a beam index type color cathode ray tube including a screen and an electron gun emitting a cathode beam which varies with a video input signal and which scans the screen, the latter having an array of color phosphor elements and index elements spaced periodically thereon; timing signal generating means for sensing the scanning by the cathode beam of the index elements and providing a timing signal whose phase depends on the timing of such scanning of the index elements; gating means controlled by the timing signal for sequentially selecting each of three primary color signals and supplying the sequentially selected primary color signals to the electron gun, and velocity modulating means for modulating the beam scanning velocity of the cathode beam to modulate the scanning velocity of the cathode beam to improve the color saturation without degrading the operation of the timing signal generating means. To achieve this objective, modulating signal generating means responsive both to the level of the video input signal and to the timing signal, supplies to the scanning velocity modulating means, a velocity modulating signal that varies both with the level of the video input signal and with the timing signal.

Still other objects, features and advantages of the present invention will become apparent from the following description taken in conjunction with the accompanying drawings, throughout which like reference characters identify the same elements.

BRIEF DESCRIPTION OF THE DRAWINGS

FIGS. 4A-D and 5 are waveform diagrams used to explain the operation of the embodiment as shown in FIGS. 2 and 3;

DESCRIPTION OF THE PREFERRED EMBODIMENTS

Figure 1:
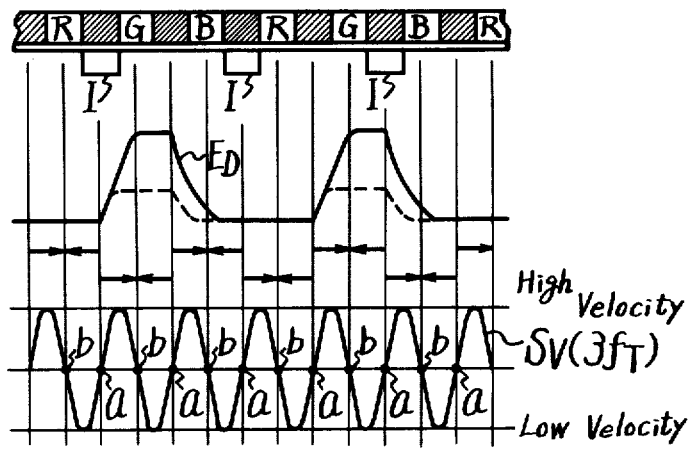
FIG. 1 is a waveform diagram used to explain a prior art technique.
Figure 2:
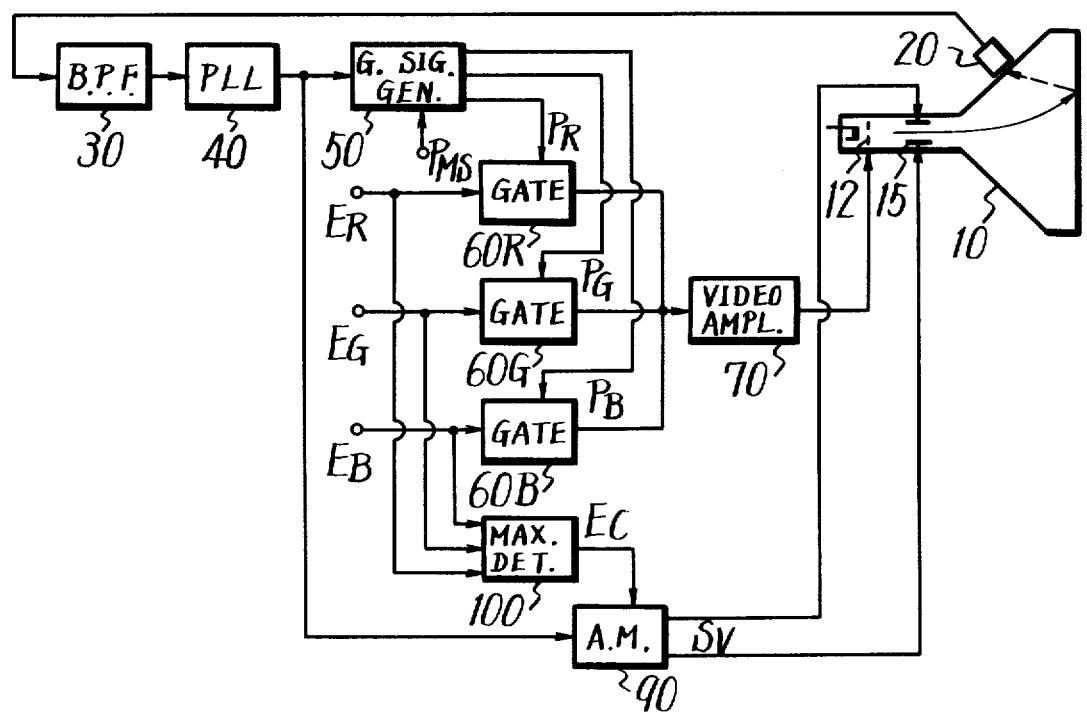
FIG. 2 is a systematic block diagram showing one embodiment of the beam index type color television receiver according to the present invention.

With reference to FIG. 2, in a first embodiment of the beam index type color television receiver according to the present invention a beam index type color cathode ray tube 10 has a photo-detector 20 located outside the funnel portion thereof, Photo-detector 20 supplies an output signal to a band pass filter 30 from which an index signal is provided with the frequency determined by the periodic spacing of the index phosphor stripes and the scanning velocity of the electron beam. The index signal is then fed to a PLL (phase locked loop) circuit 40 which produces a signal synchronized in phase with the index signal but having a frequency at the so-called write-in frequency $3 f_T$, that is, three times as the triplet frequency $f_T$ frequency at which each group of three primary color phosphor stripes R, G, B, is scanned.

The output signal from the PLL circuit 40 is supplied to a gate signal generator 50 consisting of, for example, a ring-counter. This gate signal generator 50 produces, at first being initialized by a mode-set pulse $P_{MS}$, three-phase gate signals $P_R$, $P_G$ and $P_B$ which are each of the triplet frequency $f_T$ and which are respectively used to gate red, green and blue primary color signals. The gate signals $P_R$, $P_G$ and $P_B$ are respectively supplied to gate circuits 60R, 60G and 60B which then sequentially gate red, green and blue primary color signals $E_R$, $E_G$ and $E_B$ applied thereto. The gated primary color signals are supplied through a video amplifier 70 to, for example, a first grid 12 of color cathode ray tube 10.

In the embodiment of the invention shown in FIG. 2, the signal with the write-in frequency $3 f_T$ and constant amplitude appearing at the output of PLL circuit 40 is also supplied to an amplitude modulator 90 as a carrier, and the red, green and blue primary color signals $E_R$, $E_G$ and $E_B$ are also supplied to a maximum value detecting circuit 100 from which that one of primary color signals $E_R$, $E_G$, $E_B$ having the highest level is provided as a maximum value voltage $E_C$ to the amplitude modulator 90 as a modulating signal to amplitude-modulate the signal with the write-in frequency $3 f_T$ from the PLL circuit 40. In this case, the modulation is so carried out that the amplitude of the modulated signal increases with increasing levels of maximum value voltage $E_C$. Thus, amplitude modulator 90 produces a signal $S_V$ which corresponds to the signal with the write-in frequency $3 f_T$ and which is amplitude-modulated. This amplitude-modulated signal $S_V$ is applied to a scanning velocity modulating deflection device 15 provided in the color cathode ray tube 10 to modulate the scanning velocity of the electron beam. In the example of FIG. 2, although the main deflection device used for normal deflection of the electron beam is not shown, this main deflection device is normally provided in addition to the deflection device 15 for scanning velocity modulation.

Figure 3:
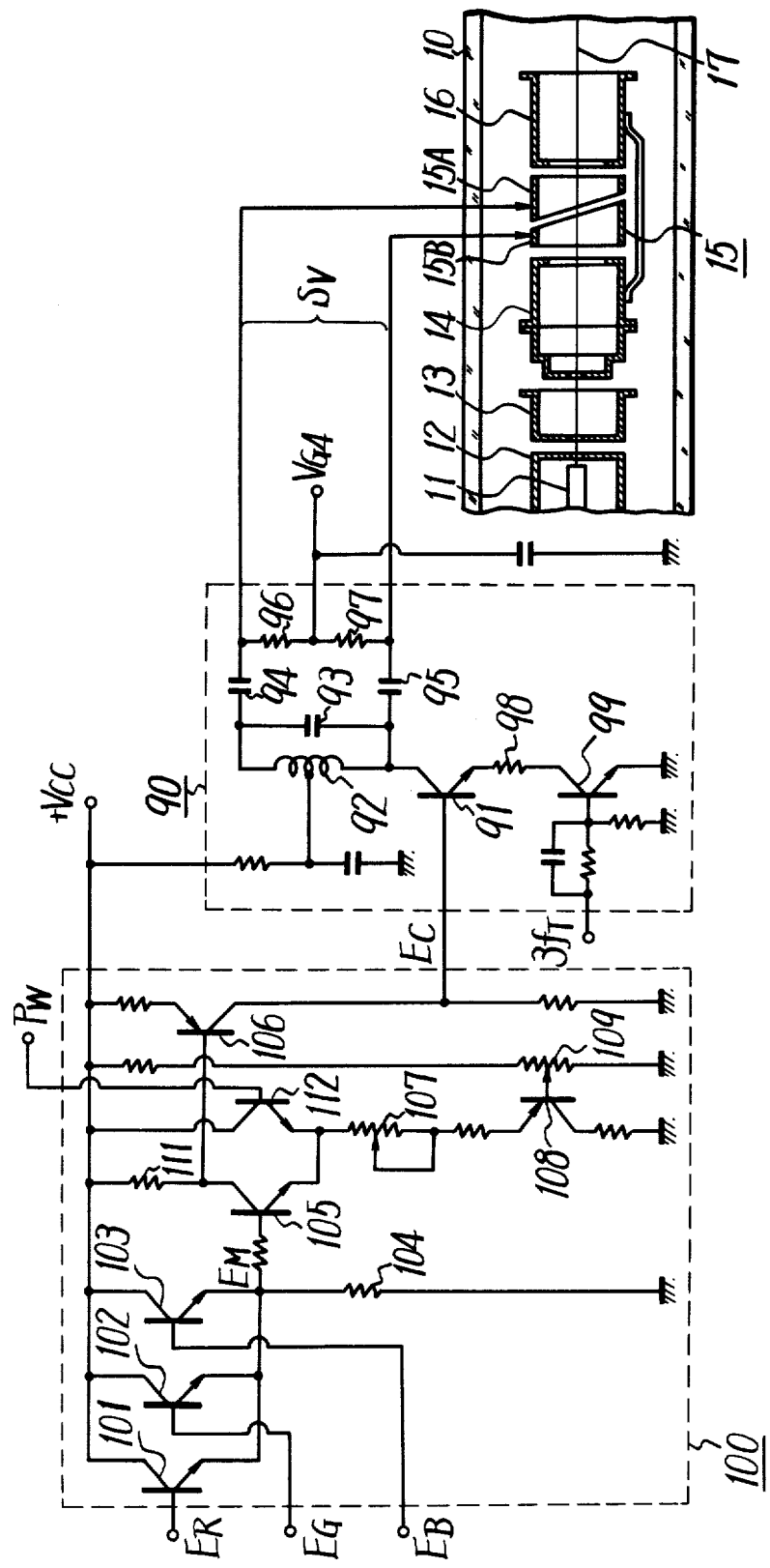
FIG. 3 is a connection diagram showing a practical example of a part of the embodiment FIG. 2.

FIG. 3 shows a practical example of maximum value detecting circuit 100, amplitude modulator 90 and deflection device 15 shown in the embodiment of FIG. 2. In this example, maximum value detecting circuit 100 includes transistors 101, 102 and 103 whose emitters are connected together to the ground through a common emitter resistor 104 and whose bases are supplied with the primary color signals $E_R$, $E_G$ and $E_B$, respectively. Therefore, one of the transistors 101, 102 and 103 is always biased ON by the primary color signal $E_R$, $E_G$, and $E_B$ of greatest value and the other two transistors are always biased OFF. Hence, at the common connection point of the emitters of transistors 101, 102, and 103, there is provided a maximum value voltage $E_M$ as shown in FIG. 4A. This maximum value voltage $E_M$ is applied to the base of a transistor 105 which delivers at its collector an inversed voltage which is in turn applied to the base of a transistor 106. A load resistor 111 couples the collector of transistor 105 to a source voltage $+V_{cc}$. Then, this transistor 106 produces at its collector the maximum value voltage $E_C$ with the polarity of voltage $E_M$, as shown in FIG. 4C. In this example, the emitter of transistor 105 is connected through a gain adjusting variable resistor 107 to the emitter of a transistor 108 whose base is supplied with a bias voltage adjusted by a variable resistor 109. Thus, when the maximum value voltage $E_M$ is lower than a certain predetermined threshold voltage $V_T$, the transistors 105, 108 and 106 turn OFF. Thus, the maximum value voltage $E_C$ is as the ground potential until the maximum value voltage exceeds threshold voltage $V_T$.

In the color cathode ray tube 10, an index phosphor stripe is formed on a horizontal run-in area at one side of the effective picture or image area of the picture screen on which the color phosphor stripes are formed. When a constant beam current flows on the horizontal run-in area, the index signal is provided. For example, the index signal at the horizontal run-in area is counted to produce the above mentioned mode-set pulse $P_{MS}$. In this example, a transistor 112 is connected in parallel to the series connection of load resistor 111 and transistor 105, and the base of transistor 112 is supplied with a pulse $P_W$, shown in FIG. 4B, which is used to control the beam current to assure that it is constant at the horizontal run-in area. Thus, at the horizontal run-in area, the transistor 112 turns ON and the transistors 105 and 106 turn OFF to set the maximum value voltage $E_C$ at the ground potential during the run-in interval.

In the amplitude modulator 90, as shown in FIG. 3, the collector of a transistor 91 is connected with a tank circuit consisting of a winding 92, capacitors 93, 94, 95 and resistors 96, 97. The emitter of transistor 91 is connected through a resistor 98 to the collector of a transistor 99, and the base of transistor 91 is supplied with the maximum value voltage $E_C$ from the maximum value voltage detecting circuit 100. The rectangular waveform signal, having the write-in frequency 3 $f_T$ and having a constant amplitude, is provided from the PLL circuit 40 to the base of transistor 99 to switch the same. Accordingly, the amplitude modulator 90 operates as a class C amplifier, so that between its output terminals, that is, from capacitors 94 and 95 there is provided the signal $S_V$, as shown in FIG. 4D, which is formed by amplitude-modulating the sinusoidal waveform having the write-in frequency 3 $f_T$ with the maximum value voltage $E_C$.

The deflection device 15 is formed of a fourth grid of cathode ray tube 10. That is, the cathode ray tube 10 includes a cathode 11, a first grid 12, a second grid 13, a third grid 14, a fourth grid 15 and a fifth grid 16 arranged in order along the same axis 17. In this case, the fourth grid 15 is formed of two electrode plates 15A and 15B which are provided by dividing one cylinder by a plane which crosses the horizontal plane at a right angle at the mid portion of the cylinder but crosses the axis 17 of the cylinder at a slant angle. A focussing or converging voltage $V_{G4}$ is applied through the resistors 96 and 97 to the electrode plates 15A and 15B which are also supplied with the above-mentioned amplitude-modulated signal $S_V$. Accordingly, the electrode plates 15A and 15B also serve as electro-static deflection plates and produce at that position a horizontal electric field corresponding to the signal $S_V$ to thereby deflect the electron beam in the horizontal direction and hence to modulate the scanning velocity of the electron beam.

According to the embodiment of the invention described above, when the gated write-in signal of the primary color signals $E_R$, $E_G$ and $E_B$ has the form as shown in the middle part of FIG. 5, the scanning velocity modulating signal $S_V$ supplied to the deflection device 15 has the form as shown in the bottom part of FIG. 5. In other words, when the maximum value of primary color signals $E_R$, $E_G$ and $E_B$ is large and the beam current is large, the amplitude of signal $S_V$ increases to modulate the scanning velocity significantly, while when the maximum value of primary color signals $E_R$, $E_G$ and $E_B$ is small and the beam current is small, the amplitude of signal $S_V$ decreases and hence the scanning velocity is modulated only very little.

According to the practical example shown in FIG. 3, when the maximum value voltage $E_M$ in the primary color signals $E_R$, $E_G$ and $E_B$ is smaller than the threshold voltage $V_T$ and the beam current is smaller than a constant value, the amplitude of scanning velocity modulating signal $S_V$ becomes zero and hence the scanning velocity is not modulated as is apparent from FIG. 4. Further, since the amplitude of scanning velocity modulating signal $S_V$ becomes zero at the horizontal run-in area and the scanning velocity is not modulated during the run-in interval, the modulation of the scanning velocity does not affect the index signal in the horizontal run-in area. Therefore, the PLL circuit 40 and the mode-set mechanism operate stably.

The modulation sensitivity of the scanning velocity may be varied in dependence on the beam deflection position with respect to the screen of cathode ray tube 10. In such a case, however, it is enough to supply a sensitivity correcting signal to the base of the transistor 91 in the amplitude modulator 90 in addition to the maximum value voltage $E_C$ to simultaneously amplitude-modulate the signal with the write-in frequency 3 $f_T$ by the sensitivity correcting signal and by the maximum value voltage $E_C$. In general, the sensitivity is low at the center portion of the screen of cathode ray tube 10 but high at its peripheral portion. Therefore, it is sufficient to use, as the sensitivity correcting signal, a parabolic waveform with the horizontal or vertical period or a composite parabolic waveform having both horizontal and vertical periods, in which the amplitude is high at the center portion of the screen of cathode ray tube 10.

Figure 6:
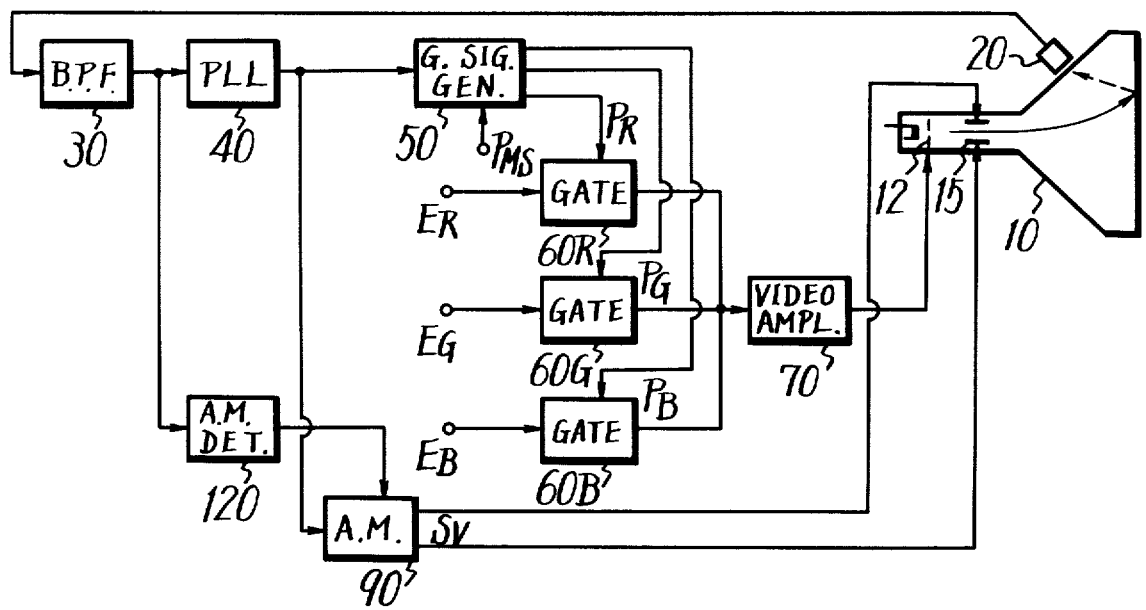
FIGS. 6 and 7 are systematic block diagrams respectively showing other embodiments of the present invention.

FIG. 6 shows another embodiment of the television receiver according to the present invention. In this example, the signal with the write-in frequency 3 $f_T$ and constant amplitude is supplied from the PLL circuit 40 to the amplitude modulator 90 as the carrier as in the first embodiment of the invention, but the index signal from the band pass filter 30 is supplied to an amplitude detector 120 to be amplitude-detected. The detected output therefrom is fed to the amplitude modulator 90 as the modulating signal. Since the amplitude of the index signal is proportional to the beam current, when the beam current is large the amplitude of signal $S_V$ becomes large to modulate the scanning velocity significantly, while when the beam current is small the amplitude of the signal $S_V$ becomes small so that the scanning velocity is modulated little, if at all. The remaining construction is substantially same as that of the embodiment shown in FIG. 2.

Figure 7:
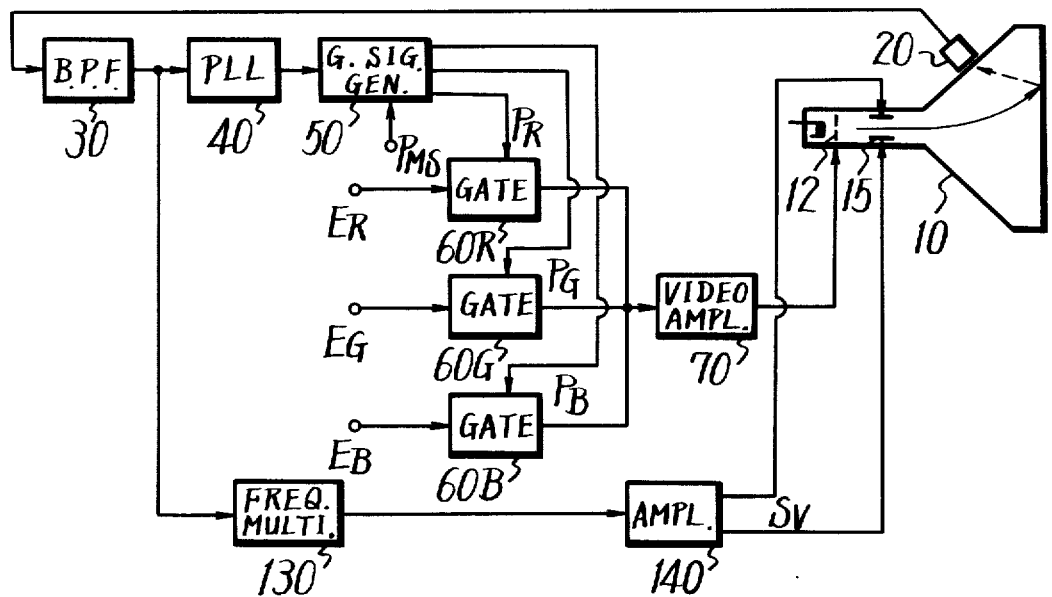

FIG. 7 shows a further embodiment of the present invention. In this embodiment, the index signal from the band pass filter 30 is fed to a frequency multiplier 130 which frequency-multiplies the same to have the write-in frequency 3 $f_T$ and supplies the frequency-multiplied signal to an amplifier 140 and thence to deflection device 15 as the scanning velocity modulating signal $S_V$.

When the index phosphor stripes I are provided in the color cathode ray tube 10 in such a manner that three index phosphor stripes I are provided for each two sets of three color phosphor stripes as shown in FIG. 5, the frequency $f_I$ of the index pulses is 3/2 of the triplet frequency $f_T$, so a frequency doubler should be used as the frequency multiplier 130.

Since the amplitude of the index signal is proportional to the beam current, the amplitude of the frequency-multiplied signal produced by frequency multiplier 130 is also proportional to the beam current. Accordingly, the scanning velocity is modulated in response to the beam current in the embodiment of FIG. 7.

In the embodiment of FIG. 7, since the index signal is supplied directly to the deflection device 15, there is less delay imparted to the velocity modulating signal $S_V$ because circuit elements such as PLL circuit 40 are avoided. Also in this embodiment the construction can be simplified as compared with other constructions.

Figure 8:
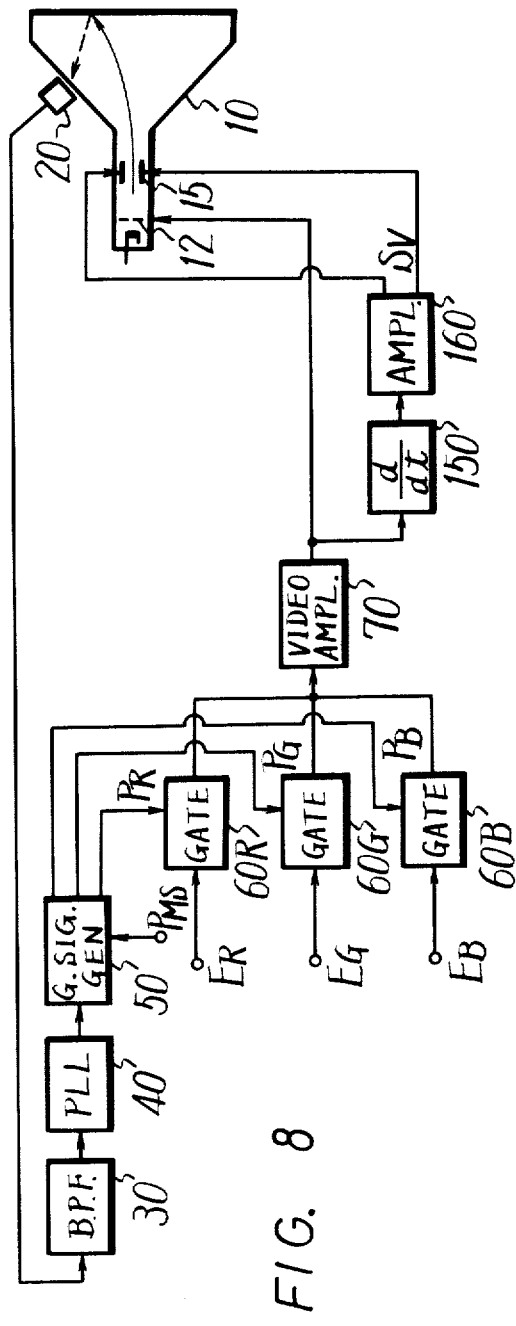
FIG. 8 is a systematic block diagram showing a further embodiment of the invention.

FIG. 8 shows a still further embodiment of the present invention. In this embodiment, the write-in signal from the video amplifier 70 is supplied to a differentiation circuit 150 to be differentiated thereby, and the differentiated signal is supplied therefrom through an amplifier 160 to the deflection device 15 as the scanning velocity modulating signal $S_V$.

Figure 9:
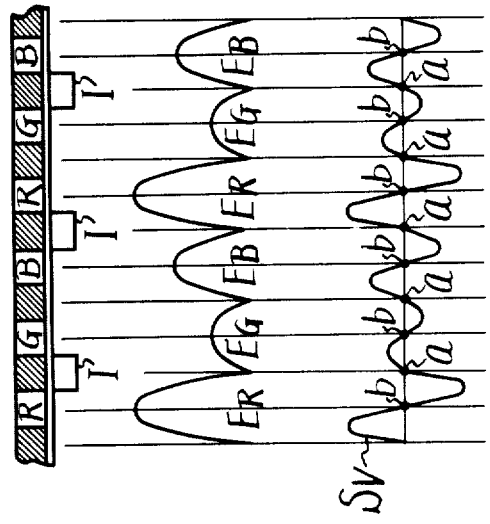
FIG. 9 is a waveform diagram used to explain the operation of the embodiment shown in FIG. 8.

In the embodiment of FIG. 8, when the changed-over write-in signal in the primary color signals $E_R$, $E_G$ and $E_B$ is provided as shown in the middle part of FIG. 9, the first differentiated signal of the write-in signal from the differentiation circuit 150 has the form as shown in the bottom part of FIG. 9. Therefore, in the embodiment of FIG. 8, the scanning velocity is modulated in response to the beam current.

A detecting circuit can also provided at the cathode of the cathode ray tube so as to detect the cathode current, i.e., beam current, and the detected beam current can be differentiated and the differentiated signal can be used as the scanning velocity modulating signal.

Also, if the beam current is less than a predetermined value, the amplitude of the scanning velocity modulating signal can be made zero so that the scanning velocity remains unmodulated not modulated, but if the beam current is higher than the predetermined value, the scanning velocity modulating signal can be made proportional to the beam current or to have a predetermined or constant amplitude to thereby modulate the scanning velocity.

As the scanning velocity modulating device, instead of the electrostatic deflection device consisting of the pair of deflection plates, 15A and 15B an electromagnetic deflection device consisting of an auxiliary horizontal deflection winding separate from the main horizontal deflection winding can be used.

According to the present invention, the scanning velocity is modulated in response to the beam current and is modulated little, if at all, not or not when the beam current is small, so that the present invention avoids the defect of prior art receivers in which the level of the index signal becomes too low when the beam current is small. Further, when the rising and falling edges of the drive voltage are highly degraded owing to the characteristic of the video amplifier, the scanning velocity is modulated significantly, while when the rising and falling edges of the drive voltage are sufficiently sharp, the scanning velocity is modulated little. Therefore, the lack of sharpness in the rising and falling edges are effectively compensated for.

Further, according to the present invention, when the beam current is large and the beam spot size increases to endanger the degree of color saturation, the scanning velocity is modulated to increase the color saturation degree, while when the beam current is small and the beam spot size remains small so that the degree of color saturation is not affected by spot size, the scanning velocity is modulated only little, if any, color saturation is correct without unnecessarily decreasing the signal-to-noise ratio of the index signal.

It will be apparent that many modifications and variations could be effected by one skilled in the art without departing from the spirit or scope of the present invention, which are to be determined by the appended claims.

We claim as our invention:

1. In a beam index color television receiver of the type which comprises a beam index type color cathode tube including a screen and an electron gun emitting a cathode beam current which varies with a video input signal and which scans said screen, the latter having an array of color phosphor elements and index elements spaced periodically thereon; timing signal generating means for sensing the scanning by said cathode beam of said index elements and providing a timing signal whose phase depends on the timing of such scanning of said index elements; gating means controlled by said timing signal for sequentially selecting each of three primary color signals in said video input signal and supplying the sequentially selected primary color signals to said electron gun; and velocity modulating means for modulating the beam scanning velocity of said cathode beam; the improvement comprising modulating signal generating means responsive both to the level of said video input signal and to said timing signal to supply to said velocity modulating means a velocity modulating signal that varies with the amplitude of said timing signal.

2. In a beam index color television receiver of the type wich comprises a beam index color cathode ray tube including a screen and an electron gun emitting a cathode beam having a beam current which varies with a video input signal and which scans said screen, the latter having an array of color phosphor elements and index elements spaced periodically thereon; timing signal generating means for sensing the scanning by said cathode beam of said index element and providing a timing signal whose phase depends on the timing of such scanning of said index elements; gating means controlled by said timing signal for sequentially selecting each of three primary color signals in said video input signal and supplying the sequentially selected primary color signals to said electron gun; and velocity modulating means for modulating the beam scanning velocity of said cathode beam; the improvement comprising modulating signal generating means responsive both to the level of said video input signal and to said timing signal to supply to said velocity modulating means a velocity modulating signal that varies both with said level of the video input signal and with said timing signal, including video signal level detecting means for detecting the level of said video input signal and a velocity modulating signal generator, to which said timing signal and the detected level of said video signal are applied, for providing said velocity modulating signal.

3. A beam index color television receiver according to claim 2, wherein said velocity modulating signal generator includes an amplitude modulator supplied with said timing signal as a carrier signal and with said detected level as a modulating signal.

4. A beam index color television receiver according to claim 3, wherein said video signal level detecting means includes a maximum value detecting circuit for detecting the highest value level occuring among the levels of said three primary color signals and providing said highest value level as said modulating signal.

5. In a beam index color television receiver of the type which comprises a beam index type color cathode ray tube including a screen and an electron gun emitting a cathode beam having a beam current which varies with a video input signal and which scans said screen, the latter having an array of color phosphor elements and index elements spaced periodically thereon; timing signal generating means for sensing the scanning by said cathode beam of said index elements and providing a timing signal whose phase depends on the timing of such scanning of said index elements, wherein said timing signal generating means includes sensing means for providing index pulses in response to the scanning of said index elements by said cathode beam, and frequency multiplying means for providing said timing signal in response to said index pulses; gating means controlled by said timing signal for sequentially selecting each of three primary color signals in said video input signal and supplying the sequentially selected primary color signals to said electron gun; and velocity modulating means for modulating the beam scanning velocity of said cathode beam; the improvement comprising modulating signal generating means to supply to said velocity modulating means a velocity modulating signal, including amplitude detecting circuit means for detecting the strength of said index pulses, and an amplitude modulator supplied with said timing signal as a carrier signal and with the detected strength of said index pulses as a modulating signal, and providing its resulting amplitude-modulated signal as said velocity modulating signal.

6. In a beam index color television receiver of the type which comprises a beam index type color cathode ray tube including a screen and an electron gun emitting a cathode beam having a beam current which varies with a video input signal and which scans said screen, the latter having an array of color phosphor elements and index elements spaced periodically thereon; timing signal generating means for sensing the scanning by said cathode beam of said index elements and providing a timing signal whose phase depends on the timing of such scanning of said index elements including sensing means for providing index pulses in response to the scanning of said index elements by said cathode beam and first frequency multiplying means for providing said timing signal in response to said index pulses; gating means controlled by said timing signal for sequentially selecting each of three primary color signals in said video input signal and supplying the sequentially selected primary color signals to said electron gun; and velocity modulating means for modulating the beam scanning velocity of said cathode beam; the improvement comprising modulating signal generating means to supply to said velocity modulating means a velocity modulating signal, including second frequency multiplying means coupled to receive said index pulses and to provide, as said velocity modulating signal, a signal that has a frequency which is a multiple of the frequency of said index pulses and an amplitude that varies with the strength of said index pulses.

7. In a beam index color television receiver of the type which comprises a beam index type color cathode ray tube including a screen and an electron gun emitting a cathode beam having a beam current which varies with a video input signal and which scans said screen, the latter having an array of color phosphor elements and index elements spaced periodically thereon; timing signal generating means for sensing the scanning by said cathode beam of said index elements and providing a timing signal whose phase depends on the timing of such scanning of said index elements; gating means controlled by said timing signal for sequentially selecting each of three primary color signals in said video input signal and supplying the sequentially selected primary color signals to said electron gun; and velocity modulating means for modulating the beam scanning velocity of said cathode beam; the improvement comprising modulating signal generating means to supply to said velocity modulating means a velocity modulating signal, including differentiating means coupled to said gating means and providing, as said velocity modulating signal, a differentiated version of the sequentially selected primary color signals.

* * * * *